INVENTOR.
ROGER M. MOSESON
BY
Christie, Parker & Hale
ATTORNEYS

June 24, 1969 R. M. MOSESON 3,451,917

RADIO FREQUENCY SPUTTERING APPARATUS

Filed Jan. 10, 1966 Sheet 2 of 5

INVENTOR
ROGER M. MOSESON

BY Christie, Parker & Hale
ATTORNEYS

INVENTOR
ROGER M. MOSESON
BY
Christie, Parker & Hale
ATTORNEYS

INVENTOR.
ROGER M. MOSESON
BY
Christie, Parker & Hale
ATTORNEYS

INVENTOR
ROGER M. MOSESON
BY
Christie, Parker & Hale
ATTORNEYS

United States Patent Office 3,451,917
Patented June 24, 1969

3,451,917
RADIO FREQUENCY SPUTTERING APPARATUS

Roger M. Moseson, Rochester, N.Y., assignor, by mesne assignments, to The Bendix Corporation, Detroit, Mich., a corporation of Delaware Filed Jan. 10, 1966, Ser. No. 519,510
Int. Cl. C23c 15/00
U.S. Cl. 204—298 17 Claims

ABSTRACT OF THE DISCLOSURE

An apparatus for radio frequency sputtering of insulative materials from a target electrode. A pair of insulating layers are positioned on opposite sides of an interleaved electrically conductive planar electrode to form the target.

The subject invention relates to the art of sputtering and, more particularly, to apparatus for depositing thin films of material on a surface of a substrate by sputtering.

The phenomenon referred to as "sputtering" has been known for many years. Initially, this phenomenon was considered undesirable since it caused blackening of tube walls, poisoning of cathodes and other deleterious effects in gas discharge and high vacuum apparatus and devices. More recently, sputtering has been developed to a highly sophisticated technique which permits the deposition of thin layers of material on various substrates.

To date, films of nearly all metallic elements and of many alloys have been deposited on substrates of insulating material, metal or metal alloys. With the advent of miniaturization in electronics and related fields, sputtering techniques have become particularly valuable.

In many applications, the sputtering of thin films of electrically insulating materials, rather than conductive substances, would be desirable. In this manner, thin films of insulating material could be provided on various substrates. For example, small electronic parts or circuits could be coated with or incapsulated in insulating material layers by the application of sputtering techniques.

One difficulty that exists, however, in connection with attempts to sputter insulators or dielectrics resides in the fact that the surface of the insulating ion target assumes an electric charge which counteracts ion impingement and sputtering. Owing to the insulating or dielectric properties of the ion target, this charge normally persists on the ion target surface and reduces the sputtering rate to uninterestingly low values.

The article "Sputtering of Dielectrics by High-Frequency Fields," by G. S. Anderson, Wm. N. Mayer, and G. K. Wehner, Journal of Applied Physics, vol. 33, No. 10, October 1962, after rejecting several existing techniques, advanced a proposal for the periodic elimination of the above mentioned surface charge. According to this proposal, an electrically conducting plate is placed immediately behind the dielectric target. The target is energized by means of a high-frequency potential applied to the conducting plate with respect to the plasma. According to this article, the high-frequency or radio frequency of this potential is preferably in the megacycle range so as to reduce the accumulation of a positive charge on the target surface between alternate half cycles.

The technique proposed in that article appears primarily useful in connection with the etching, cleaning and smoothening of dielectric substrates by ion bombardment. However, difficulties are still present if this technique is to be applied to sputtering and film deposition apparatus and methods in which the dielectric or insulating target is located inside a vacuum space, such as an evacuated bell jar. In this case, sputtering not only takes place from the dielectric target, but also from the electrode plate located inside the vacuum space and immediately behind the dielectric target shown, for example, in FIG. 1 of the cited article. It would be highly desirable to have sputtering apparatus in which sputtering of undesired material is practically eliminated or at least materially reduced.

In addition, it would be highly desirable to have sputtering apparatus in which changeovers from one sputter material to another can be conveniently and speedily effected.

The subject invention accomplishes these desiderata and provides new and useful improvements in the art of film depostion by sputtering. These improvements permit the sputtering and film deposition of insulating materials, provide for a speedy changeover from one sputter material to another, improve the quality of the resulting film, and promote the protection of the power supply equipment, to name some examples.

In a first preferred embodiment, an apparatus according to the invention comprises an enclosure, means for evacuating the enclosure, means for introducing a quantity of an ionizable gas into the evacuated enclosure, means for mounting the substrate to be provided with a thin film of sputtered material in the enclosure, and means for establishing an ion plasma in the enclosure and sputtering material onto a surface of the substrate with the aid of ions from the plasma. According to the invention, the means for establishinng the above mentioned ion plasma and sputtering the material include an electrode located in the envelope and having an electrically conducting layer enclosed in the insulating material to be sputtered, means for providing electric radio frequency oscillations, and capacitive means for coupling these radio frequency oscillations to said electrode. The electrode including the electrically conducting layer enclosed in insulating material may be composed of two plates of the insulating material to be sputtered having the electrically conducting layer sandwiched therebetween.

In a series of preferred embodiments, the means for establishing the above mentioned ion plasm, from which ions for the sputtering process are drawn, include a cathode, which may be of a heated type, and an anode which is biased so as to attract electrons from the cathode. In these embodiments the above mentioned electrode is located laterally of the ion plasma to serve as an ion target structure. The radio frequency oscillations capacitively coupled to this ion target structure cause the attraction of ions from the ion plasma to the target structure, the neutralization of undesirable charges and generation of a negative charge on the target surface and the sputtering of material from such target structure. The above mentioned substrate is mounted such that the surface on which a thin film is to be deposited is oriented for the reception of material sputtered from the ion target structure.

If at least one of the above mentioned two plates of insulating material is directly exposed to the ion bombardment from the plasma, the sputtering of such insulating material will take place and the deposited film on the substrate will be of insulating material, which, for example, may be glass.

If desired, the surface of the plate of insulating material located most closely to the ion plasma may be covered with a layer of a particular substance, which may be conducting or insulating, and which is to be deposited on the substrate.

The capacitive coupling of radio frequency energy to the assembly which includes the conducting layer enclosed in insulating material may be effected by a structure which includes a conducting plate located adjacent to but spaced from this assembly, a wire for conducting radio frequency energy to such plate from the outside of the enclosure and means of insulating material, such as glass, for enclosing the plate and the wire to prevent sputtering of material therefrom. The enclosed plate last mentioned acts in the manner of a capacitor plate which cooperates with the above mentioned enclosed conducting layer to transmit or couple radio frequency energy to the ion target whereupon the above mentioned sputtering process will occur.

Radio frequency energy may also be capacitively coupled to the above mentioned ion target by running a wire from the enclosed conducting layer of such target to the outside of the vacuum enclosure. Means of insulating material, such as a glass tube, cover most of the length of this wire to prevent sputtering of material therefrom. The end of the wire outside the vacuum enclosure is connected to one terminal of a capacitor through which radio frequency energy is supplied to the wire and from there to the ion target. The wire may be connected to the ion target by a flexible conductor which acts in the nature of a hinge and permits tilting movement of the ion target to various angles. The tilting movement, which may also be realized with the other type of capacitive coupling mentioned before, permits a control of the deposited film thickness and density as a function of location.

In either type of embodiment, the exchangeability of the ion target and of the type of material sputtered, and the adaptability of the target to various situations and tasks is conveniently and reliably effected. To facilitate an exchange of ion targets in the embodiments in which the above mentioned wire is connected to enclosed conducting layer of the ion target, such connection is advantageously effected through a terminal which permits convenient and speedy release and replacement of ion targets.

Much of what has been said so far is also applicable to a further series of preferred embodiments in which the above mentioned assembly including a conducting layer enclosed in insulating material is itself a means for producing an ion plasma. In this further series of embodiments, the assembly just mentioned is located to one side, and a first electrode is located to another side, of the region in which the establishment of an ion plasma is desired. The energizing radio frequency energy is then applied to such first electrode on the one hand, and is capacitively coupled to the above mentioned assembly on the other hand, whereby the establishment and maintenance of an ion plasma is possible. Ions from such plasma will again sputter material from the above mentioned assembly. However, the yield of such sputtering is not sufficient in all applications. A higher yield can be obtained by positioning a further plate laterally of the ion plasma and by electrically biasing such plate so that the plate attracts ions from the plasma and operates thus as an ion target from which sputtering takes place. The material thus sputtered from the further plate is deposited on the substrate, which is suitably positioned to receive such material.

The capacitive coupling of energy to the above mentioned assembly with intervening conducting layer may be effected by any of the above mentioned methods and means.

To render the apparatus described so far more versatile and to permit the sputtering and deposition of metals, the conducting layer which has been described above as being enclosed in insulating material may also be exposed to the ion plasma and may be positioned so as to face this plasma. This aspect of the invention will be more fully elaborated on as this description proceeds.

In a further preferred embodiment of the invention, the apparatus includes an enclosure, means for evacuating the enclosure and means for introducing a quantity of an ionizable gas into the enclosure. An electrode is located in the enclosure and a dielectric ion target, such as an ion target consisting of electrically insulating material, is located in the enclosure on one side of the electrode just mentioned. Means for mounting a substrate at a location spaced from the dielectric ion target are provided in the enclosure. The apparatus includes means for applying electrical radio frequency energy between the electrode and the means for mounting the substrate to cause the establishment of an ion plasma between the dielectric ion target and the substrate and sputtering of material, by ions from the ion plasma, from the dielectric ion target onto the substrate to deposit a thin film on the substrate. According to the invention, the apparatus includes shielding means located at the electrode and the ion target for shielding the electrode against the impact of ions from the ion plasma and inhibiting a substantial emanation of material from the electrode.

In this manner, the electrode behind the ion target is guarded against gradual disintegration by sputtering and the substrate is guarded against contamination by material from the electrode.

The means for applying radio frequency energy may preferably include a radio frequency generator and capacitive means for coupling radio frequency energy from this generator to the above mentioned electrode. If a lead is employed for feeding radio frequency energy to the above mentioned electrode, the shielding means include means encompassing the lead to prevent the impact on the lead of ions from the ion plasma and inhibit the emanation of material from the lead.

To improve the ion plasma and the sputtering process, means for establishing a magnetic field through the ion plasma may preferably be provided.

A further preferred embodiment of the invention permits the deposition of films of electrically conducting materials on the substrate. This embodiment again includes the above mentioned enclosure, means for evacuating the enclosure and means for introducing a quantity of an ionizable gas into the enclosure. An electrode is located in the enclosure and a layer of electrically conducting material is also located in the enclosure and is spaced from the electrode. A dielectric plate is located between this electrode and the layer of conducting material for capacitively coupling this layer to the electrode. Means are provided in the enclosure for mounting the substrate at a location spaced from the layer of conducting material. Electrical radio frequency energy is applied between the above mentioned electrode and the means for mounting the substrate to cause the establishment of an ion plasma between the layer of conducting material and the substrate and the sputtering of material, by ions from the ion plasma, from this layer to the substrate to deposit a thin film of conducting material on the substrate. In this preferred embodiment, shielding means are located at the above mentioned electrode and dielectric plate for shielding the electrode against impact of ions from the ion plasma and inhibiting a substantial emanation of material from this electrode.

The invention will become readily apparent from the following detailed description of preferred embodiments thereof, illustrated by way of example in the accompanying drawings, in which.

In the drawings, like parts are designated by like reference characters.

Figure 1:
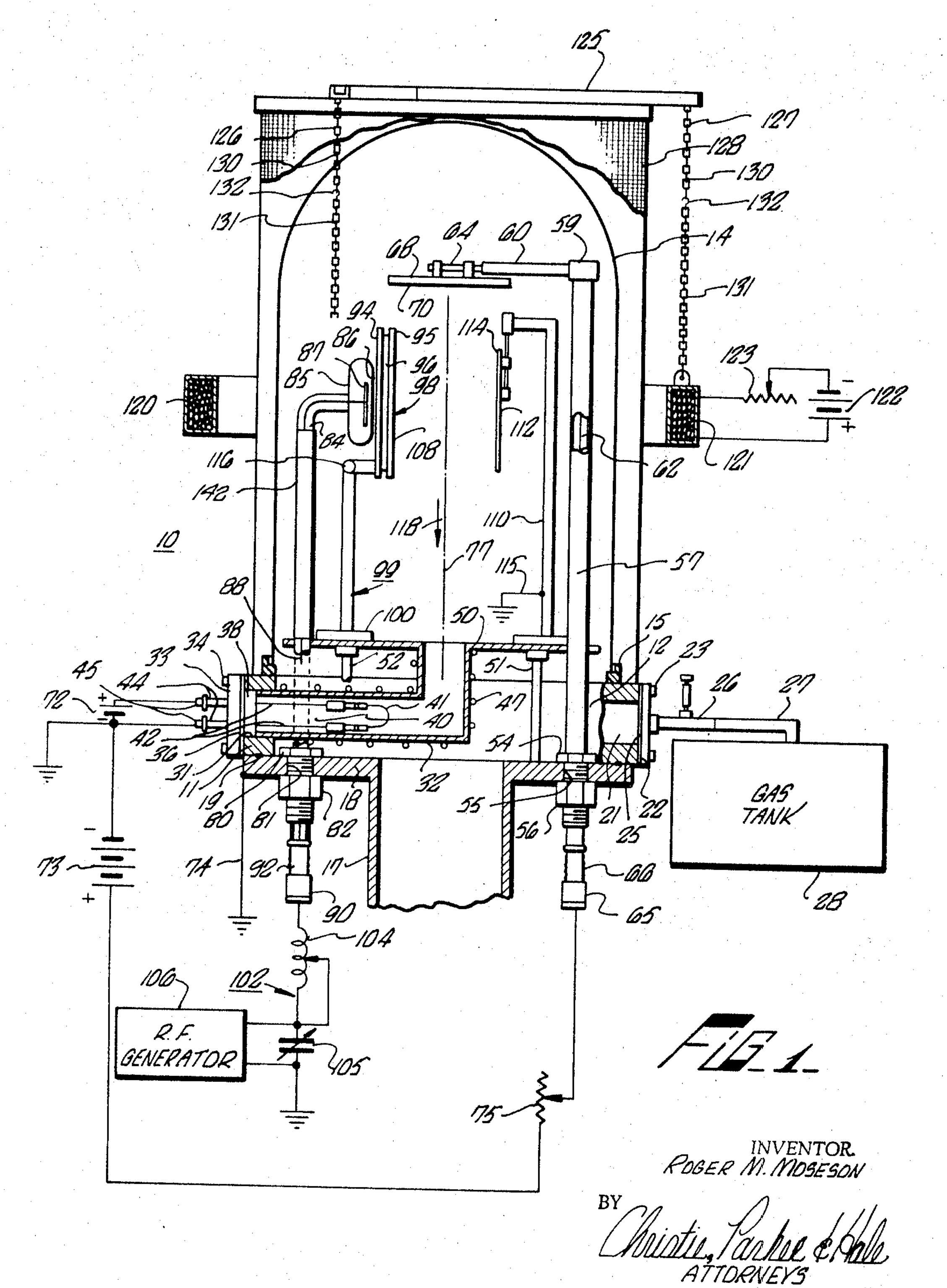
FIG. 1 shows an elevation, partially in section, of a film depositing and sputtering apparatus, with associated circuitry, according to a preferred embodiment of the invention.

The film depositing and sputtering apparatus 10 shown in FIG. 1 comprises a base 11 having a central opening 12, and a removable bell jar 14 located on base 11 and sealed thereto at the annular structure 15. A vacuum conduit 17 is connected to base 11 by a flange 18 and a gasket 19. The space in base 11 and bell jar 14 is evacuated by means of a conventional high vacuum pump (not shown) which is connected to vacuum conduit 17 through a turn-off valve (not shown) in a conventional fashion.

The base 11 has a first lateral aperture 21 which communicates with the opening 12. A flange 22 is mounted to the base 11 at aperture 21 by a number of bolts 23. A sealing ring 25 seals the flange 22 to the base 11. A manually adjustable needle valve 26 is connected to flange 22 so that one of its ports communicates with aperture 21. The other port of needle valve 26 is connected to a pipe 27 which leads to a gas tank 28. The gas tank, which may for instance be a gas bottle, contains an ionizable gas, such as argon, which has the effect of facilitating the ionization process in the bell jar 14, when admitted to the base 11 and jar 14 by the needle valve 26 in small quantities. It would also be possible to provide the necessary ionizing environment in bell jar 14 by adjusting the operation of the vacuum pump so as to permit a sufficient number of gas molecules to remain in the bell jar 14 during the evacuation process. However, the use of a separate gas tank and needle valve permits a more convenient and precise adjustment of the ionization environment.

The ionization environment may, for example, be provided by first evacuating the bell jar to a pressure of about one micron or lower. This low pressure is maintained during the preparatory steps which may include degassing of the cathode. The above mentioned shut-off (not shown) at the vacuum pump is then closed and the needle valve 26 is actuated to permit the admission of a desired amount of ionizing gas to the bell jar. To name a figure, the pressure of the ionizing gas in the bell jar may be from about one to ten microns.

The base 11 has a second lateral aperture 31 which communicates with the space in bell jar 14 through a substantially tubular filament shield 32. A flange 33 is fastened to the base 11 at aperture 31 by a number of bolts 34. A sealing ring 36 seals the flange 33 to the base 11. Flange 33 has an extension 38 which forms the base of a cathode member 40. The cathode member further includes a filament 41 which is mechanically supported and supplied with electric current by a pair of leads 42 that extend to the flange 33 and are insulated therefrom by a pair of insulating sleeves 44. A pair of terminals 45 is mounted on sleeve 44 and connected to leads 42. In the illustrated embodiment, the filament shield 32 carries a coil of tubing 47 which is connected to a supply of coolant liquid in a conventional manner not shown per se. The coolant liquid is caused to circulate through tubing or coil 47 so as to cool the filament shield. In this manner, overheating of the filament shield causing evaporation and outgassing contaminating particles is reduced. A plate 50 encompasses the upper end of filament shield 32 and is supported by a pair of studs 51 and 52.

A bushing 54 extends through a bore 55 in flange 18 and is held therein by a nut 56. If desired and necessary, a conventional vacuum sealing ring (not shown) may be employed at the bushing 54. A tube 57 extends through and is sealed to the bushing 54. Tube 57 carries at its upper end an elbow member 59. A further tube 60 is connected to elbow member 59 to extend substantially perpendicularly to tube 57. An insulated wire 62 extends through tubes 57 and 60. One end of wire 62 is connected to an anode support rod 64 which is mounted on and insulated from the tube 60. The other end of wire 62 is connected to a terminal 65 which is mounted on the lower end of tube 57 by an insulator 66. An anode 68 is suspended from, and electrically connected to, the support 64. The anode 68 has an anode surface 70 which faces in the direction of filament shield 32.

After the base 11 and bell jar 14 have been evacuated, the filament 41 is supplied with a heating current from a battery 72 which is connected to the terminals 45. The anode 68 is then positively biased with respect to the filament 41 by a battery 73. The negative terminal of battery 73 is connected to one of the filament terminals 45 and is grounded, however grounding is not necessary. The apparatus 10 is also grounded as shown at 74. The positive terminal of battery 73 is connected to the anode terminals 65 through a variable resistor 75.

The heated filament 41 will release electrons which are attracted toward the anode surface 70. These electrons will collide with gas molecules present in bell jar 14. The gas molecules will thus be ionized and an ion plasma will form in the space between the anode 68 and the plate 50. The ion plasma will extend substantially along an axis indicated by phantom line 77. The needle valve 26 may be adjusted from time to time to admit a desired number of gas molecules from the tank 28 to the ion plasma. Since the cathode is in the form of a heated filament, a large number of electrons will be released into the bell jar 14 and a vigorous formation of the ion plasma will take place.

A further bushing 80 extends through an aperture 81 in flange 18 and is held therein by a nut 82. If desired or necessary, a conventional vacuum sealing ring (not shown) or similar means may be employed at bushing 80 to insure a vacuum tight seal. A tube 84, which is preferably of glass or an insulating material of similar electrical properties, extends through and is sealed to bushing 80. Various conventional glass-to-metal sealing techniques or devices are suitable for assuring a reliable seal between the tube 84 and the bushing 80. The tube 84 is bent inside the bell jar 14 and carries at its upper end a bulb or bulbous vessel 85 which is preferably of the same insulating material as the tube 84. The bulbous vessel 85 is sealed in a vacuum tight fashion to tube 84 and the inside of vessel 85 may be in communication with the inside of tube 84. In the shown embodiment, the bulbous vessel 85 defines a flat face plate portion 86.

An electrically conductive plate 87, which may be of metal, is located inside the bulbous vessel 85. A wire 88 extends through the tube 84 and electrically connects the plate 87 to a terminal 90 which is mounted on the tube 84 by means of an insulator 92. The insulator 92 is not absolutely necessary if the tube 84 is of glass or of a similarly effective insulating material and extends through the entire length of and beyond the bushing 80, as shown.

Two plates 95 and 95 of an insulating material, such as glass, are located in the front of the bulbous vessel 85. In the illustrated embodiment, the plates 94 and 95 have a layer 96 of an electrically conducting material, such as a metal, located therebetween. The insulating plates 94 and 95 with intervening conducting layer 96 may be cemented or otherwise held together to form an ion target assembly 98. This assembly is cemented to the upper end of a stand 99 which has a foot 100 slidably disposed on the previously mentioned plate 50. The stand 99, or at least that part thereof which is in relatively close proximity to the assembly 98 is made of glass or a similarly effective insulating material to prevent the stand 99 from displaying undesirable sputtering effects.

A radio frequency loading circuit 102 is connected between terminal 90 and ground. The circuit 102 includes an adjustable coil 104 and an adjustable capacitor 105 which are connected in series and which are of a nature well known per se.

A radio frequency generator 106 is connected across the capacitor 105 and feeds radio frequency energy to the loading circuit 102. The radio frequency generator 106 is also of a conventional type. The frequency of the electrical oscillations supplied by the generator 106 may have a value of several megacycles per second. Frequencies of up to 50 megacycles per second are still suitable. In a preferred embodiment of the invention, I have employed a frequency within the range of from 10-15 megacycles per second.

The wire 88 conducts the radio frequency energy supplied by the generator 106 to the plate 87. By means of a capacitive coupling or high-frequency induction, this energy is transmitted to the ion target assembly 98 which includes the conducting layer 96. The capacitive redistribution of energy between plate 87 and ion target 98 results in a fairly uniform distribution of energy on the ion target. As illustrated, the plate 87 may be smaller than target 98 or layer 96.

Under the influence of the radio frequency energy, surface portions of ion target 98 will alternately assume positive and negative charges. When the surface 108 of the ion target assembly has a negative charge, ions are attracted from the above mentioned ion plasma and are accelerated to the surface 108. These accelerated ions impinge upon the surface 108 with sufficient momentum to cause the ejection of atoms therefrom. Sputtering of material will thus take place from the surface 108. A stand 110 mounts the substrate 112 within the bell jar 14 and positions the surface 114 of the substrate for the reception of material sputtered from the ion target assembly 98. If desired, the substrate 112 may be grounded, as is indicated at 115, so as to increase the degree of capacitive coupling with respect to the ion target 98.

In the embodiment shown in FIG. 1, the film that will deposit itself on substrate surface 114 will be of the same material as the plate 95. Thus, if this plate 95 is of glass, the film that is formed on surface 114 will also be of glass. No deleterious sputtering of material from the conductor 88 or the plate 87 can take place, since these parts are enclosed in the tube 84 and the bulbous vessel 85, respectively. The conductive layer 96 will also not sputter, since it is sandwiched between the plates 94 and 95. The embodiment of FIG. 1 thus prevents the contamination of the film forming on the substrate surface 114. The capacitive coupling and redistribution principles employed in the embodiment according to FIG. 1 also permit ion targets of various sizes and configurations to be employed to produce substrate films of various dimensions and shapes. In addition, the exchange of ion targets among a considerable variety of targets of different materials, configurations, and dimensions is speedily and conveniently effected.

To control the degree of capacitive coupling, the stand 99 with its foot 100 may be shifted on the plate 50 relative to the plate 87. The ion target 98 may also be tilted laterally by turning the stand 99, and with respect to the vertical by actuating the flexible elbow 116 of the stand 99. In this manner, the thickness of the sputtered film along the substrate surface 114 may be controlled. For further control of this film thickness and density, a magnetic field indicated generally by the arrow 118 may be established in the bell jar 14. To this end, the apparatus 2 illustrated in FIG. 1 includes an annular magnet structure 120 which houses an electromagnetic coil 121 that encompasses the bell jar. 14. A source 122 of electric current, such as a battery, supplies the coil 121 with energizing current through a variable resistor 123. The magnetic field produced by the coil 121 is thus of controllable strength. The magnet structure 120 is suspended from a support 125 by means of three equally spaced chains, two of which are visible in FIG. 1 at 126 and 127. The support 125 rests on a removable cylindrical cover 128 which rests on the base 11 and which may have a cylindrical side wall of non-magnetic wire mesh. Each chain is composed of two parts 130 and 131 that are inter-connected by a hook 132 that is fastened to the part 131 and that can be inserted in any one of the links of part 130. In this manner, it is possible to lift or lower the coil with respect to the ion plasma and ion target. At the same time, it is also possible to tilt the coil with respect to the axis 77 by inserting the hooks 132 into links at different levels among the three suspension chains. The orientation and location, along with the strength of the magnetic field may thus be varied so as to control the density of the ions attracted at the ion target assembly, and the density of the deposited film along and across the substrate surface.

In practice, it has been found that undesirable sputtering of material from the tube 84 may be reduced or inhibited by providing a grounded shield, as shown at 142 in FIG. 1, about a desired length of the tube 84. This expedient may also be employed in the embodiments according to the other figures.

Figure 2:
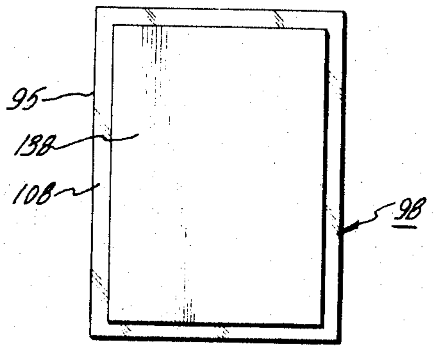
FIG. 2 shows a modified electrode for the apparatus of FIG. 1.

FIG. 2 shows a modification of the ion target structure 98 of FIG. 1. According to FIG. 2, a layer 138 is located on the surface 108 of the insulating material plate 95. In view of its location, the layer 138, which may be of a metal, is exposed to the ions that are attracted from the ion plasma. In this manner, material is sputtered from the layer 138. While the layer 138 shown in FIG. 2 does not cover fully the surface 108, it should be understood that this layer may be made to extend to the edges of the insulating material plate 95.

Figure 3:
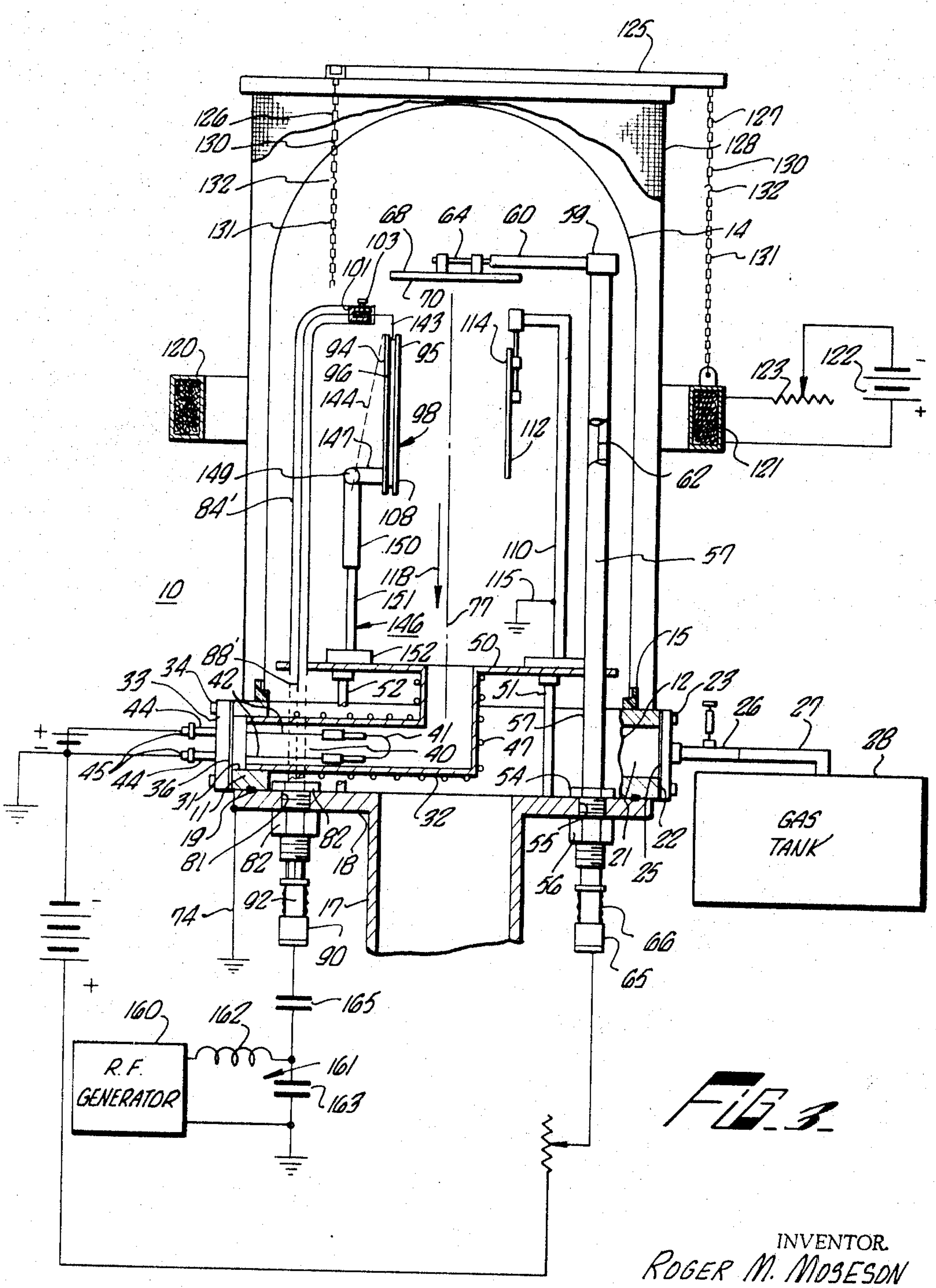
FIG. 3 shows an elevation, partially in section, of a film depositing and sputtering apparatus, with associated circuitry, according to another embodiment of the invention.

The general structure and arrangement of the film depositing and sputtering apparatus shown in FIG. 3 is in many respects similar and partially even identical to the structure and arrangement of the apparatus shown in FIG. 1. Reference should thus be had to the foregoing description pertaining to FIG. 1 as far as the nature and function of those parts in FIG. 3 is concerned that bear the same reference numerals as their corresponding parts in FIG. 1.

The ion target 98 employed in the embodiment of FIG. 3 has the two plates 94 and 95 of insulating material and the intervening layer 96 of a conducting material, already shown and described in connection with FIG. 1. In contrast to the wire 88 in the embodiment of FIG. 1, the wire 88' of the embodiment of FIG. 3 is electrically connected through a terminal 101 to the intervening conducting layer 96. A tube 84' of insulating material, such as glass, encloses the wire 88' and the terminal 101. In this manner, sputtering of material from the wire 88' is prevented. In the embodiment shown in FIG. 3, the electric connection of the wire 88' to the layer 96 is effected through a flexible lead 143 which permits the ion target 98 to be tilted, as indicated by the dotted line 144; relative to the ion plasma, indicated by the phantom line 77. The lead 143 is inserted into the terminal 101 and is removably held therein by a set screw 103. Other types of suitable terminals may, of course, also be employed. The ion target 98 is supported by a stand 146 which has an arm 147 cemented to the ion target. The stand 146 further includes an adjustable elbow 149, two telescopically interconnected parts 150 and 151, and a foot 152 which is slidably located on plate 50. The ion target 98 can thus be tilted into a wide variety of positions. This permits a control of the thickness and density of the sputtered film as a function of location.

A radio frequency generator 160 provides electrical radio frequency energy for the ion target 98. Generator 160 is connected to a loading circuit 161, which is composed of a coil 162 and a capacitor 163, either or both of which may be adjustable, if desired. One side of the load circuit 161 is grounded. Another point of the load circuit 161 is coupled to the wire 88' by means of a capacitor 165.

In some of my experiments, I found that only heating takes place at the ion target 98 if the capacitor 165 is omitted and the terminal 90 directly or galvanically connected to the load circuit 161. In these experiments, sputtering from the ion target 98 took place upon the insertion of the capacitor shown at 165 which thus performed an important function.

With the radio frequency generator 160 connected and coupled as illustrated in FIG. 3, an attraction of ions from the ion plasma symbolized by phantom line 77 to the ion target 98 will take place. These ions will sputter material from the surface 108 of the ion target 98, or of the insulating material plate 95, to be more exact. The surface 114 of the substrate 112 is again positioned so as to receive material sputtered from the ion target 98, as has already been explained in connection with the embodiment shown in FIG. 1.

For an explanation of the nature and function of the parts in FIG. 3 not so far described, reference should be had to the description of the corresponding parts shown in FIG. 1.

Apart from this, it will be recognized that the unifying feature of the embodiments shown in FIGS. 1 and 3 is the similar ion target and the capacitive coupling of the radio frequency generator to the ion target, as well as the ease of exchangeability of the ion target. Both embodiments are characterized by a wide flexibility and adaptability to a large number of desired conditions and tasks.

The sputtering and film depositing apparatus shown in FIG. 4 again contains many parts that have already been described in connection with FIG. 1 to which reference should be had for a description of those parts.

Figure 4:
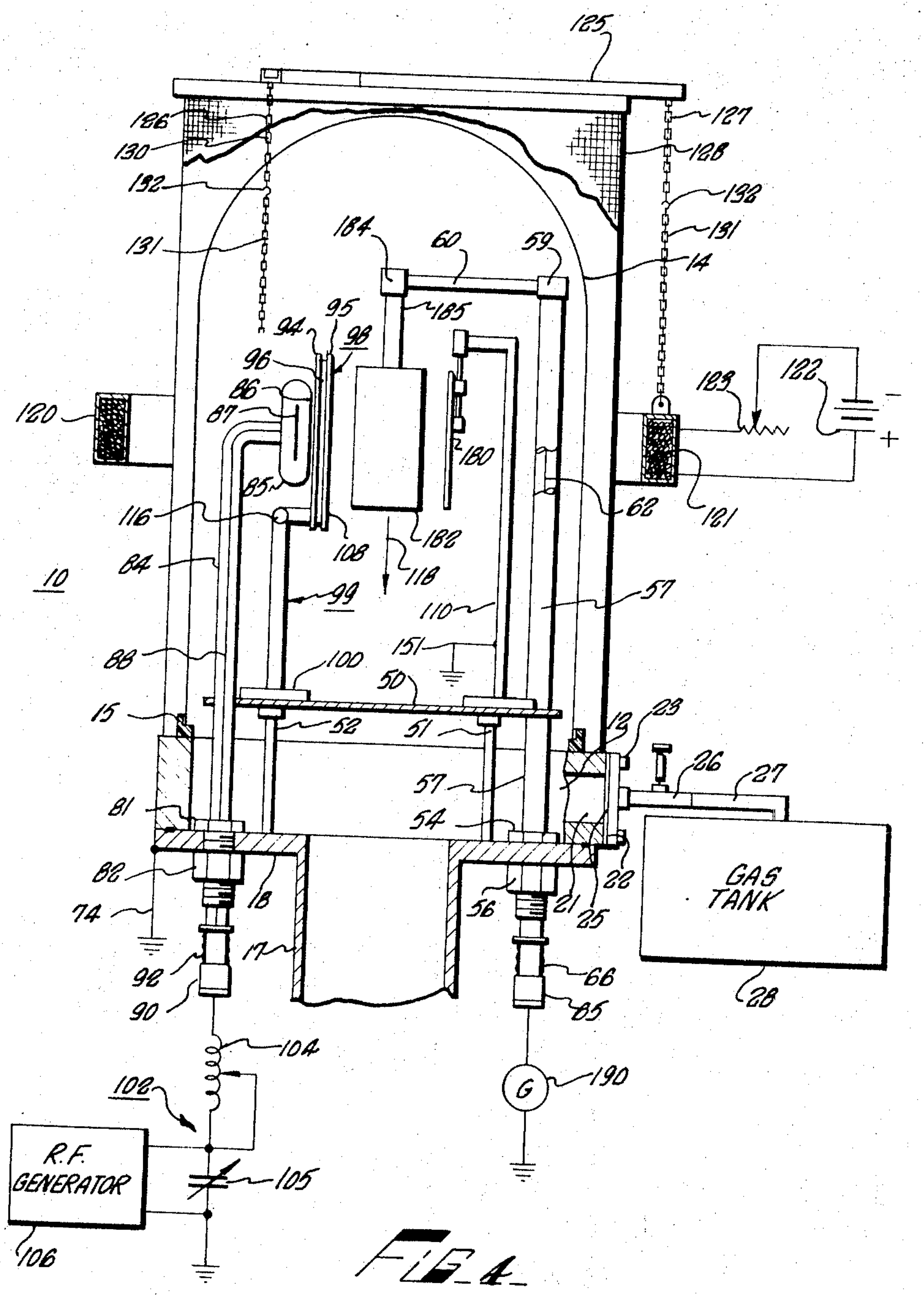
FIG. 4 shows an elevation, partially in section, of a film depositing and sputtering apparatus, with associated circuitry, according to a further embodiment of the invention.

The most readily noticeable distinguishing feature of the embodiment of FIG. 4 over the embodiments of FIGS. 1 and 3 is the absence of the cathode structure 40 and the anode structure 68 employed in the embodiments of FIGS. 1 and 3. It will be recalled that these cathode and anode structures in those embodiments were the elements that produced the ion plasma symbolized by the phantom line 77 in FIGS. 1 and 3. The embodiment of FIG. 4 employs other methods and means for producing the necessary ion plasma, as will become apparent as this description proceeds.

More specifically, the embodiment of FIG. 4 employs the tube 84, bulb 85, plate 87, wire 88, ion target assembly 98, stand 99, radio frequency load circuit 102 and radio frequency generator 106 already shown in, and described in connection with FIG. 1. In the embodiment of FIG. 4, a grounded electrode plate 180 takes the place of the substrate 114 shown in FIG. 1.

The radio frequency energy that is capacitively transmitted to the electrode assembly 98, composed of insulating material plates 94 and 95 and intervening conducting layer 96, causes the establishment of an ion plasma between the assembly 98 and the electrode 180. Ions from this plasma cause the sputtering of material from the surface 108 of plate 95. This sputtered material deposits itself on a substrate (not shown) located on the surface 180. A simple sputtering apparatus is thus provided. Insulating plate 94 acts as a shielding means to guard the layer or electrode 96 against the impact of ions from the ion plasma and to inhibit a substantial emanation of material from this layer or electrode. Shielding of the wire or lead 88 and the plate 87 is provided in a similar manner by the insulating tube 84 and the bulbous vessel 85. Undesirable contamination is thus significantly reduced if not practically eliminated.

If a high sputtering yield is desired for a given application, a further electrode plate 182 is positioned so as to face the plasma between assembly 98 and electrode 180. The electrode 182 is suspended from the tube 60 previously described. To this end, an elbow 184 is provided on tube 60 and a short tubular member 185 is mounted on elbow 184. The tubular member 185 is preferably of insulating material, so that the electrode 182 can be directly mounted thereon. The insulated wire 62 previously described connects the electrode 182 to the terminal 65 below the bottom of the apparatus. A source of direct or alternating current, herein shown as generator 190, is connected between terminal 65 and ground so as to impress an electric potential on electrode 182 to cause the attraction of ions from the ion plasma between assembly 98 and plate 182. The ions impinging on plate 182 will cause the sputtering of material therefrom.

Figure 5:
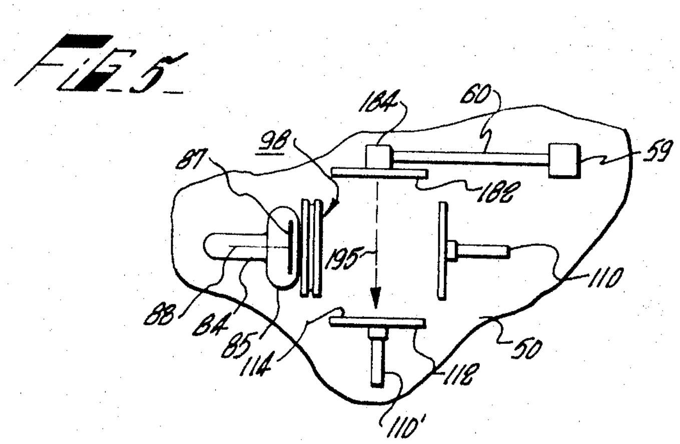
FIG. 5 shows a top view of an electrode arrangement used in the embodiment according to FIG. 4.

As illustrated in FIG. 5, which shows a top view of the electrode arrangement employed in FIG. 4 and immediately associated parts, the previously mentioned surface 114 of the substrate 112 is positioned by means of a stand 110', that is similar to the stand 110, to receive material sputtered from the electrode 182. The general trajectory of such sputtered material is symbolized by the dotted arrow 195.

The embodiment shown in FIG. 4 has most of the advantages of the embodiment illustrated in FIG. 1, but does not need a heated cathode for its operation.

Figure 6:
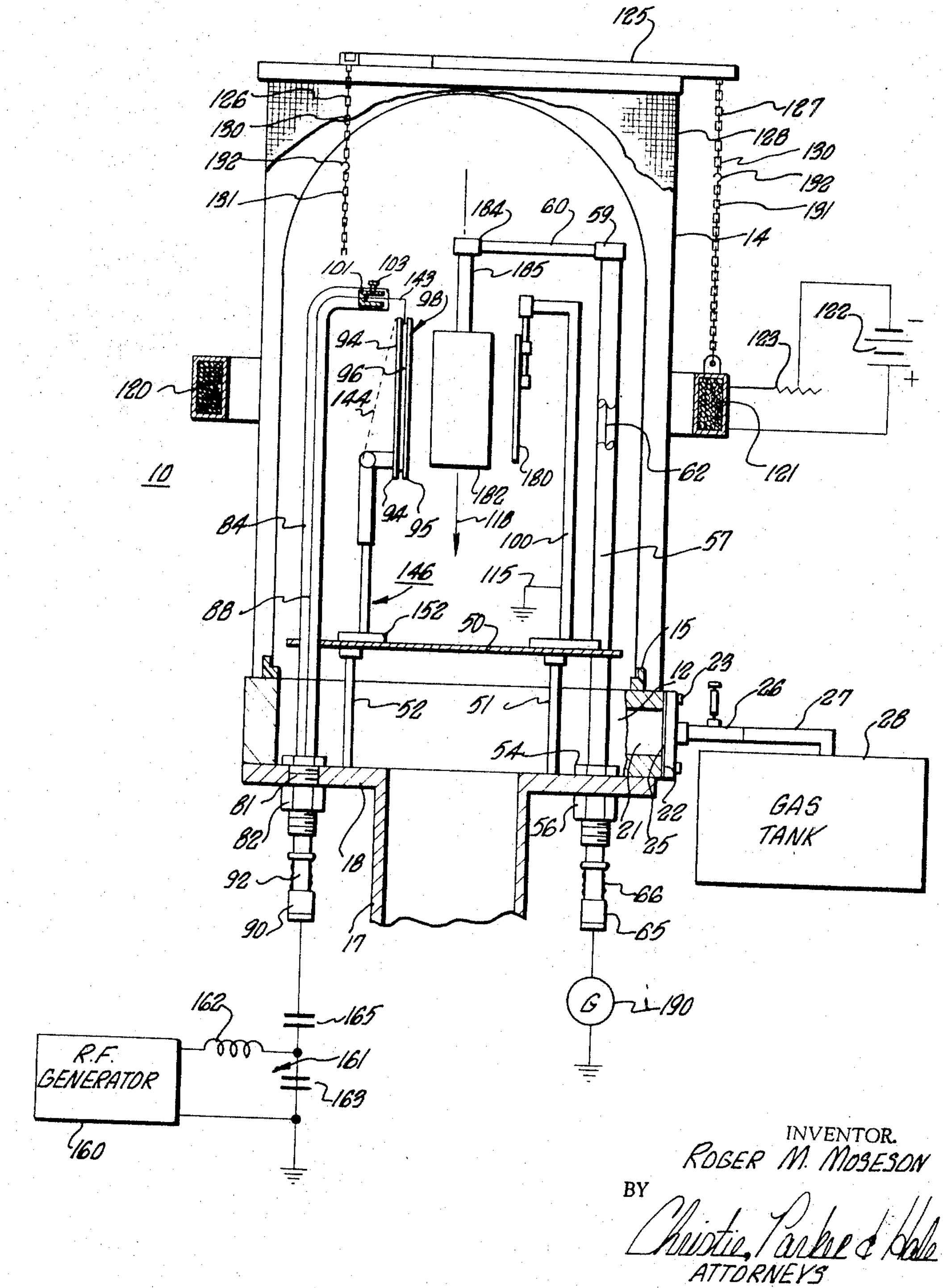
FIG. 6 shows an elevation, partially in section, of a film depositing and sputtering apparatus, with associated circuitry, according to yet another embodiment of the invention.

The embodiment shown in FIG. 6 can be viewed as an incorporation of the principles employed in the embodiment of FIG. 4 into the apparatus according to FIG. 3. Thus, the electrode assembly 98 is constructed, energized and supported in the same manner as the same electrode assembly 98 in FIG. 3. The electrode plate 180 shown in FIG. 4 is also employed in the embodiment of FIG. 6, and an ion plasma will be established between such electrodes 180 and the assembly 98, so that material may be sputtered onto a substrate (not shown) located on plate 180. If desired the ion target electrode 182 shown in FIG. 4 may again be provided, suspended and energized in the same manner in the embodiment of FIG. 6 The substrate is then not located on the plate 180, but is positioned in the manner shown in FIG 5 at 112, so as to receive material sputtered from electrode 182 The operation of these alternatives has been described in connection with FIG. 4.

The embodiment of FIG. 6 has most of the advantages of the embodiment of FIG. 3 but does not require a heated cathode for its operation. The function of the embodiment of FIG. 6 is closely similar to the function of the embodiment of FIG. 4 except that the capacitive coupling between the radio frequency generator 160 and the electrode assembly 98 is provided by means of the external capacitor 165, in the manner described and illustrated in connection with the embodiment of FIG. 3.

Figure 7:
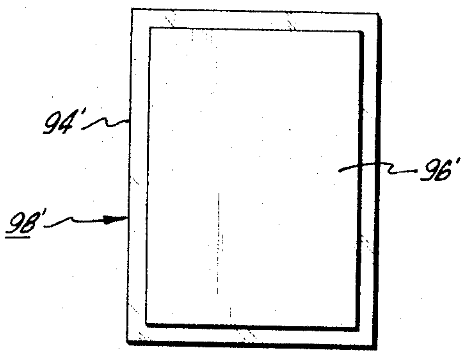
FIG. 7 shows a further modified electrode or ion target structure.

The modified ion target 98' illustrated in FIG. 7 may be employed in any of the embodiments shown and described before. This modified ion target 98' includes a plate 94' of insulating material, such as glass, and a layer 96' of an electrically conducting material, such as a metal, which is desired to be sputtered and deposited on a substrate.

If the ion target 98' is employed in lieu of the ion target 98 in the embodiment illustrated in FIG. 1, the insulating plate 94' shown in FIG. 7 is positioned in the location shown in FIG. 1 for the plate 94. The metal layer 96' shown in FIG. 7 then occupies the position of the metal layer 96 in the embodiment of FIG. 1. Since the modified ion target 98' does not have a plate of the type of the plate 95 shown in FIG. 1, the metal layer 96' is exposed to and faces the ion plasma that will form in the embodiment of FIG. 1.

Thus, if the modified ion target 98' is employed in the apparatus of FIG. 1, radio frequency energy will be capacitively coupled to the metal layer 96'. Ions from the plasma will then be attracted to the layer 96' and material will be sputtered from this metal layer 96' and will be deposited on the substrate 112 shown in FIG. 1. The insulating plate 94' covers the back surface of the metal layer 96' and constitutes a dielectric member of the capacitive arrangement including plate 87, bulb face 86 and layer 96'

It will now be appreciated that the modified ion target 98' shown in FIG 7 can be employed in the embodiment of FIG. 1 in lieu of the ion target 98, so as to permit the deposition of films of electrically conducting material with this equipment. This renders the apparatus shown in FIG. 1 more versatile and useful.

By the same token, the modified structure 98' shown in FIG. 7 can be substituted for the structure 98 shown in the embodiments of FIGS. 3, 4 and 6. The insulating plate 94' and the metal plate 96' shown in FIG. 7 are then, respectively, substituted for the insulating plate 94 and the metal layer 96 illustrated in FIG. 3, 4 or 6. This substitution, and the substitution described above in connection with FIG. 1, amount, in effect, to a deletion of the insulating plate 95 in these figures, so that the metal layer 96 is exposed. It is for this reason that the nature and function of the modified target shown in FIG. 7 will be understood by those skilled in the art without further illustrations.

It will now be recognized that the subject invention provides a series of related sputtering and film depositing apparatus that are characterized by superior performance and adaptability to various situations and tasks, as compared to previously proposed film depositing systems.

Those skilled in the art will also appreciate that various modifications of the described and illustrated embodiments are possible within the spirit and scope of the invention.

I claim:

1. Apparatus for depositing thin films of material on a substrate by sputtering, comprising an enclosure for containing an ionizable atmosphere, and means for establishing an ion plasma and sputtering of material in said enclosure, said means including a sandwich structure located in said enclosure having a pair of electrically insulating planar layers, one each of said pair of insulating layers being located on opposite sides of and abutting an interleaved electrically conductive planar layer, an electrode in said enclosure coupled to said electrically conductive layer for coupling electrical radio frequency energy to said structure to cause the attraction of ions from said ion plasma to said structure and the sputtering of material from said structure onto a substrate located in said enclosure, and means for shielding said electrode against the impact of ions from said plasma.

2. Apparatus according to claim 1 wherein said electrode is spaced from the electrically conducting and insulating layers for capacitively coupling radio frequency energy to said conducting layer.

3. Apparatus according to claim 1 wherein said means for shielding said electrode is an enclosure of insulating material containing said electrode.

4. Apparatus according to claim 3 including a lead extending through part of said enclosure and being connected to said electrode for conducting electrical radio frequency energy to said electrode, and a tube of insulating material enclosing said lead to prevent ion impact onto said lead from said plasma.

5. Apparatus according to claim 1 including means for tilting said structure into various positions.

6. Apparatus according to claim 5 wherein said structure includes a metal layer enclosed between at least two insulating layers.

7. Apparatus according to claim 6 wherein said metal layer is disposed on one of said insulating layers.

8. Apparatus according to claim 7 wherein said means for establishing an ion plasma include an anode spaced from said structure and means for releasing electrons toward said anode.

9. Apparatus according to claim 8 wherein said means for releasing electrons include a heated cathode filament.

10. Apparatus according to claim 8 wherein said means for establishing an ion plasma include said structure and means spaced from said structure for receiving electrical radio frequency energy.

11. Apparatus according to claim 10 wherein said means for sputtering material include further an ion target electrically biased to receive ions from said ion plasma for the sputtering of material from said ion target.

12. Apparatus according to claim 11 including means for mounting a substrate for the reception of material sputtered from said ion target.

13. Apparatus according to claim 12 including means for establishing a magnetic field in said enclosure.

14. Apparatus for depositing thin films of material on a substrate by sputtering, comprising an enclosure for containing an ionizable atmosphere, and means for establishing an ion plasma and sputtering of material in said enclosure, said means including a sandwich structure located in said enclosure having a pair of electrically insulating planar layers, one each of said pair of insulating layers being located on opposite sides of and abutting an interleaved electrically conductive planar layer, a releasable terminal located in said enclosure in the vicinity of said structure, means for releasably connecting the electrically conductive layer of said structure to said terminal, a lead extending through part of said enclosure and being connected to said terminal for conducting electrical radio frequency energy to said terminal to cause the attraction of ions from said ion plasma to said structure and the sputtering of material from said structure onto a substrate located in said enclosure, and a tube of insulating material enclosing said lead to prevent ion impact onto said lead from said ion plasma.

15. Apparatus according to claim 14 including means for shielding at least part of said terminal to prevent ion impact onto said part of the terminal from said ion plasma.

16. Apparatus according to claim 15 wherein said means for releasably connecting the electrically conducting layer of said structure to said terminal includes a flexible conductor.

17. Apparatus according to claim 16 including a grounded shield of an electrically conducting material extending over at least part of said tube for preventing ion impact from said ion plasma onto said part of the tube.

References Cited

UNITED STATES PATENTS

| | | | |
|---|---|---|---|
| 3,021,271 | 2/1962 | Wehner | 204—192 |
| 3,258,413 | 6/1966 | Pendergast | 204—192 |
| 3,287,243 | 11/1966 | Ligenza | 204—192 |
| 3,291,715 | 12/1966 | Anderson | 204—298 |
| 3,336,211 | 8/1967 | Mayer | 204—192 |
| 3,347,772 | 10/1967 | Laegreid et al. | 204—298 |

OTHER REFERENCES

Kay: J. of App. Phys., vol. 34, No. 4 (part I), April 1963, pp. 760–8.

ROBERT K. MIHALEK, *Primary Examiner.*

U.S. Cl. X.R.

204—192